(12) United States Patent
Pantelidou et al.

(10) Patent No.: US 12,452,740 B2
(45) Date of Patent: Oct. 21, 2025

(54) COMMUNICATION SYSTEM FOR MACHINE LEARNING METADATA

(71) Applicant: NOKIA TECHNOLOGIES OY, Espoo (FI)

(72) Inventors: Anna Pantelidou, Massy (FR); Cinzia Sartori, Pullach (DE); Malgorzata Tomala, Wroclaw (PL); Hakon Helmers, Sceaux (FR)

(*) Notice: Subject to any disclaimer, the term of this patent is extended or adjusted under 35 U.S.C. 154(b) by 415 days.

(21) Appl. No.: 18/020,542

(22) PCT Filed: Aug. 11, 2020

(86) PCT No.: PCT/FI2020/050524
§ 371 (c)(1),
(2) Date: Feb. 9, 2023

(87) PCT Pub. No.: WO2022/034259
PCT Pub. Date: Feb. 17, 2022

(65) Prior Publication Data
US 2023/0300686 A1 Sep. 21, 2023

(51) Int. Cl.
*H04W 36/00* (2009.01)
*G06N 20/00* (2019.01)
(52) U.S. Cl.
CPC ........ *H04W 36/0033* (2013.01); *G06N 20/00* (2019.01); *H04W 36/0083* (2013.01)
(58) Field of Classification Search
CPC ......... H04W 36/0033; H04W 36/0083; H04W 24/02; H04W 36/0005; G06N 20/00
See application file for complete search history.

(56) References Cited

U.S. PATENT DOCUMENTS

| | | | |
|---|---|---|---|
| 12,069,532 B2* | 8/2024 | Venkataraghavan | H04W 24/02 |
| 2011/0195707 A1* | 8/2011 | Faerber | H04W 24/08 455/423 |
| 2016/0302128 A1* | 10/2016 | Anchan | H04W 72/20 |
| 2019/0019106 A1 | 1/2019 | Driscoll et al. | |

(Continued)

FOREIGN PATENT DOCUMENTS

| | | |
|---|---|---|
| WO | 2019/172813 A1 | 9/2019 |
| WO | 2019/226670 A1 | 11/2019 |
| WO | 2021/219201 A1 | 11/2021 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

(Continued)

*Primary Examiner* — Abdullahi E Salad
(74) *Attorney, Agent, or Firm* — Carter, DeLuca & Farrell LLP

(57) ABSTRACT

There is provided a network apparatus that is caused to receive as part of a handover procedure for handover of a terminal to the network apparatus, metadata about at least one machine learning model accessible for execution and/or training by the terminal, determining whether or not the terminal should execute and/or train the at least one machine learning model after the terminal is handed over to the network apparatus; and signal the result of the determining to the terminal.

1 Claim, 7 Drawing Sheets

(56) References Cited

U.S. PATENT DOCUMENTS

2019/0171978 A1* 6/2019 Bonawitz ............... G06F 16/95
2023/0124118 A1* 4/2023 Khirallah ............. H04W 4/029
 455/456.1

OTHER PUBLICATIONS

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"New WID on Study on traffic characteristics and performance requirements for AI/ML model transfer in 5GS", 3GPP TSG-SA WG1 Meeting #88, S1-193606, Agenda: 5, OPPO, Nov. 18-22, 2019, 3 pages.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.1.0, Mar. 2020, pp. 1-438.

Extended European Search Report received for corresponding European Patent Application No. 20949472.3, dated Apr. 15, 2024, 10 pages.

Masood et al., "Deep Learning Based Detection of Sleeping Cells in Next Generation Cellular Networks", IEEE Global Communications Conference (GLOBECOM), Dec. 9-13, 2018, 6 pages.

International Search Report and Written Opinion dated Feb. 2, 2021 corresponding to International Patent Application No. PCT/FI2020/050524.

ITU-T, "Framework for data handling to enable machine learning in future networks including IMT-2020," Y.3174, Series Y: Global Information Infrastructure, Internet Protocol Aspects, Next-Generation Nertworks, Internet of Things and Smart Cities, Future networks, Feb. 2020.

ITU, "Draft new Supplement 55 to ITU-T Y.3170-series (former ITU-T Y.ML-IMT2020-USe-Cases): Machine learning in future networks including IMT-2020: use cases, " for approval, SG13-TD224/PLEN, Study Group 13, Oct. 2019.

3GPP TS 37.320 V16.1.0 (Jul. 2020), Technical Specification, 3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16), Jul. 2020.

Notice of Allowance received for corresponding European Patent Application No. 20949472.3, dated Feb. 6, 2025, 8 pages.

* cited by examiner

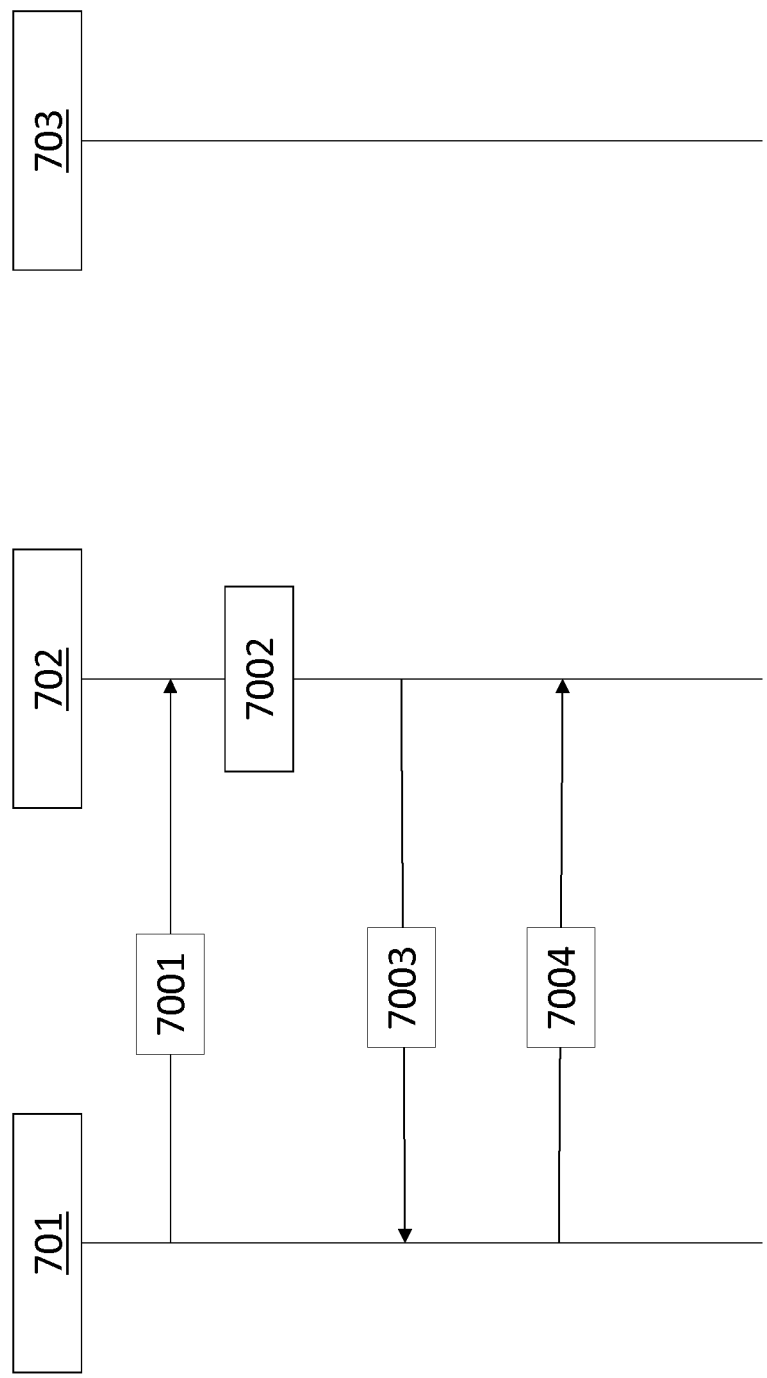

COMMUNICATION SYSTEM FOR MACHINE LEARNING METADATA

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided a network apparatus comprising: means for receiving, as part of a handover procedure for handover of a terminal to the network apparatus, metadata about at least one machine learning model accessible for execution and/or training by the terminal; means for determining whether or not the terminal should execute and/or train the at least one machine learning model after the terminal is handed over to the network apparatus; and means for signalling the result of the determining to the terminal.

The means for receiving may comprise means for receiving the metadata from a source network apparatus in the handover procedure.

The network apparatus may further comprise: means for signalling at least one of the terminal and a source network apparatus in the handover procedure for more information about the at least one machine learning model; and means for receiving a response from the signalled entity.

The means for signalling for more information may comprise means for signalling a request to provide at least one of the at least one machine learning models.

The means for receiving may comprise means for receiving the metadata in a Handover Request message.

The means for receiving may comprise means for receiving metadata about at least one machine learning models accessible for training and/or execution by the terminal, and the means for determining may comprise means for determining for each of said at least one machine learning models whether or not the terminal should execute and/or train that machine learning model after the terminal is handed over to the network apparatus.

The means for signalling may perform said signalling after the terminal has been instructed to handover to the network apparatus, and/or the means for signalling may perform said signalling as part of handover signalling.

According to a second aspect, there is provided an apparatus for a terminal, the apparatus comprising: means for signalling, to a network apparatus, metadata about at least one machine learning model accessible for execution and/or training by the terminal; and means for receiving signalling indicating whether or not the terminal should execute and/or train the at least one machine learning model after the terminal is handed over to the network apparatus.

The means for signalling may comprise means for signalling the metadata to a source network apparatus for signalling to the network apparatus.

The means for signalling may comprise means for signalling metadata about at least one machine learning models accessible for training and/or execution by the terminal, and the means for receiving may comprise means for receiving for each of said at least one machine learning algorithms an indication whether or not the terminal should execute and/or train that machine learning model after the terminal is handed over to the network apparatus.

The means for signalling may comprise means for signalling the metadata as part of a measurement report to a source network apparatus.

The apparatus may comprise means for abandoning at least one of the at least one machine learning models in response to said receiving signalling.

The apparatus may comprise means for receiving a request to provide at least one of the machine learning algorithms to a network apparatus; and means for responding to the request with at least one of the requested machine learning models.

According to a third aspect, there is provided a network apparatus comprising: means for receiving, from a terminal, metadata about at least one machine learning model accessible for execution and/or training by the terminal; and means for signalling, to a target network apparatus, the metadata as part of a handover procedure.

The network apparatus may comprise means for signalling to the terminal a request for further information on at least one of the at least one machine learning models in dependence on the received metadata.

The request for further information may be a request for at least one of the at least one machine learning models and/or further metadata relating to at least one of the at least one machine learning models.

The network apparatus may comprise means for determining whether or not to signal the further information to the target network apparatus in dependence on the metadata, and the means for signalling may comprise signalling said further information when it is determined to signal the further information.

The means for receiving the metadata may comprise means for receiving the metadata with measurement data, and/or the means for signalling the metadata may comprise means for signalling the metadata as part of a Handover Request message.

The network apparatus may comprise means for sending the at least one machine learning model to the target network apparatus in response to a received request for the at least one machine learning model from the target network apparatus.

According to a fourth aspect, there is provided a network apparatus comprising at least one processor and at least one memory comprising computer code that, when executed by the at least one processor, causes the network apparatus to: receive, as part of a handover procedure for handover of a terminal to the network apparatus, metadata about at least one machine learning model accessible for execution and/or training by the terminal; determine whether or not the terminal should execute and/or train the at least one machine learning model after the terminal is handed over to the network apparatus; and signal the result of the determining to the terminal.

The receiving may comprise receiving the metadata from a source network apparatus in the handover procedure.

The network apparatus may further be caused to: signal at least one of the terminal and a source network apparatus in the handover procedure for more information about the at least one machine learning model; and receive a response from the signalled entity.

The signalling for more information may comprise signalling a request to provide at least one of the at least one machine learning models.

The receiving may comprise receiving the metadata in a Handover Request message.

The receiving may comprise receiving metadata about at least one machine learning models accessible for training and/or execution by the terminal, and the determining may comprise determining for each of said at least one machine learning models whether or not the terminal should execute and/or train that machine learning model after the terminal is handed over to the network apparatus.

The signalling may perform said signalling after the terminal has been instructed to handover to the network apparatus, and/or the signalling may perform said signalling as part of handover signalling.

According to a fifth aspect, there is provided an apparatus for a terminal, comprising at least one processor and at least one memory comprising computer code that, when executed by the at least one processor, causes the terminal to: signal, to a network apparatus, metadata about at least one machine learning model accessible for execution and/or training by the terminal; and receive signalling indicating whether or not the terminal should execute and/or train the at least one machine learning model after the terminal is handed over to the network apparatus.

The signalling may comprise signalling the metadata to a source network apparatus for signalling to the network apparatus.

The signalling may comprise signalling metadata about at least one machine learning model accessible for training and/or execution by the terminal, and the receiving may comprise receiving for each of said at least one machine learning algorithms an indication whether or not the terminal should execute and/or train that machine learning model after the terminal is handed over to the network apparatus.

The signalling may comprise signalling the metadata as part of a measurement report to a source network apparatus.

The terminal may be caused to abandon at least one of the at least one machine learning models in response to said receiving signalling.

The terminal may be caused to receive a request to provide at least one of the machine learning algorithms to a network apparatus; and respond to the request with at least one of the requested machine learning models.

According to a sixth aspect, there is provided a network apparatus comprising at least one processor and at least one memory comprising computer code that, when executed by the at least one processor, causes the network apparatus to: receive, from a terminal, metadata about at least one machine learning model accessible for execution and/or training by the terminal; and signal, to a target network apparatus, the metadata as part of a handover procedure.

The network apparatus may be caused to signal to the terminal a request for further information on at least one of the at least one machine learning models in dependence on the received metadata.

The request for further information may be a request for at least one of the at least one machine learning models and/or further metadata relating to at least one of the at least one machine learning models.

The network apparatus may be caused to determine whether or not to signal the further information to the target network apparatus in dependence on the metadata, and the signalling may comprise signalling said further information when it is determined to signal the further information.

The receiving the metadata may comprise receiving the metadata with measurement data, and/or the signalling the metadata may comprise signalling the metadata as part of a Handover Request message.

The network apparatus may be caused to send the at least one machine learning model to the target network apparatus in response to a received request for the at least one machine learning model from the target network apparatus.

According to a seventh aspect, there is provided a method for a network apparatus, the method: receiving, as part of a handover procedure for handover of a terminal to the network apparatus, metadata about at least one machine learning model accessible for execution and/or training by the terminal; determining whether or not the terminal should execute and/or train the at least one machine learning model after the terminal is handed over to the network apparatus; and signalling the result of the determining to the terminal.

The receiving may comprise receiving the metadata from a source network apparatus in the handover procedure.

The method may comprise: signalling at least one of the terminal and a source network apparatus in the handover procedure for more information about the at least one machine learning model; and receiving a response from the signalled entity.

The signalling for more information may comprise signalling a request to provide at least one of the at least one machine learning models.

The receiving may comprise receiving the metadata in a Handover Request message.

The receiving may comprise receiving metadata about at least one machine learning models accessible for training and/or execution by the terminal, and the determining may comprise determining for each of said at least one machine learning models whether or not the terminal should execute and/or train that machine learning model after the terminal is handed over to the network apparatus.

The signalling may perform said signalling after the terminal has been instructed to handover to the network apparatus, and/or the signalling may perform said signalling as part of handover signalling.

According to an eighth aspect, there is provided a method for an apparatus for a terminal, the method comprising: signalling, to a network apparatus, metadata about at least one machine learning model accessible for execution and/or training by the terminal; and receiving signalling indicating whether or not the terminal should execute and/or train the at least one machine learning model after the terminal is handed over to the network apparatus.

The signalling may comprise signalling the metadata to a source network apparatus for signalling to the network apparatus.

The signalling may comprise signalling metadata about at least one machine learning model accessible for training and/or execution by the terminal, and the receiving may comprise receiving for each of said at least one machine learning algorithms an indication whether or not the terminal should execute and/or train that machine learning model after the terminal is handed over to the network apparatus.

The signalling may comprise signalling the metadata as part of a measurement report to a source network apparatus.

The method may comprise abandoning at least one of the at least one machine learning models in response to said receiving signalling.

The method may comprise: receiving a request to provide at least one of the machine learning algorithms to a network apparatus; and responding to the request with at least one of the requested machine learning models.

According to a ninth aspect, there is provided a method for a network apparatus, the method comprising: receiving, from a terminal, metadata about at least one machine learning model accessible for execution and/or training by the terminal; and signalling, to a target network apparatus, the metadata as part of a handover procedure.

The method may comprise: signalling to the terminal a request for further information on at least one of the at least one machine learning models in dependence on the received metadata.

The request for further information may be a request for at least one of the at least one machine learning models and/or further metadata relating to at least one of the at least one machine learning models.

The method may comprise: determining whether or not to signal the further information to the target network apparatus in dependence on the metadata, and the signalling may comprise signalling said further information when it is determined to signal the further information.

The receiving the metadata may comprise receiving the metadata with measurement data, and/or the signalling the metadata may comprise signalling the metadata as part of a Handover Request message.

The method may comprise sending the at least one machine learning model to the target network apparatus in response to a received request for the at least one machine learning model from the target network apparatus.

According to a tenth aspect, there is provided a network apparatus comprising: receiving circuitry for receiving, as part of a handover procedure for handover of a terminal to the network apparatus, metadata about at least one machine learning model accessible for execution and/or training by the terminal; determining circuitry for determining whether or not the terminal should execute and/or train the at least one machine learning model after the terminal is handed over to the network apparatus; and signalling circuitry for signalling the result of the determining to the terminal.

The receiving circuitry may comprise receiving circuitry for receiving the metadata from a source network apparatus in the handover procedure.

The network apparatus may further comprise: signalling circuitry for signalling at least one of the terminal and a source network apparatus in the handover procedure for more information about the at least one machine learning model; and receiving circuitry for receiving a response from the signalled entity.

The signalling circuitry for more information may comprise signalling circuitry for signalling a request to provide at least one of the at least one machine learning models.

The receiving circuitry may comprise receiving circuitry for receiving the metadata in a Handover Request message.

The receiving circuitry may comprise receiving circuitry for receiving metadata about at least one machine learning models accessible for training and/or execution by the terminal, and the determining circuitry may comprise determining circuitry for determining for each of said at least one machine learning models whether or not the terminal should execute and/or train that machine learning model after the terminal is handed over to the network apparatus.

The signalling circuitry may perform said signalling after the terminal has been instructed to handover to the network apparatus, and/or signalling circuitry may perform said signalling as part of handover signalling.

According to an eleventh aspect, there is provided an apparatus for a terminal, the apparatus comprising: signalling circuitry for signalling, to a network apparatus, metadata about at least one machine learning model accessible for execution and/or training by the terminal; and receiving circuitry for receiving signalling indicating whether or not the terminal should execute and/or train the at least one machine learning model after the terminal is handed over to the network apparatus.

The signalling circuitry may comprise signalling circuitry for signalling the metadata to a source network apparatus for signalling to the network apparatus.

The signalling circuitry may comprise signalling circuitry for signalling metadata about at least one machine learning models accessible for training and/or execution by the terminal, and the receiving circuitry may comprise receiving circuitry for receiving for each of said at least one machine learning algorithms an indication whether or not the terminal should execute and/or train that machine learning model after the terminal is handed over to the network apparatus.

The signalling circuitry may comprise signalling circuitry for signalling the metadata as part of a measurement report to a source network apparatus.

The apparatus may comprise abandoning circuitry for abandoning at least one of the at least one machine learning models in response to said receiving signalling.

The apparatus may comprise receiving circuitry for receiving a request to provide at least one of the machine learning algorithms to a network apparatus; and responding circuitry for responding to the request with at least one of the requested machine learning models.

According to a twelfth aspect, there is provided a network apparatus comprising: receiving circuitry for receiving, from a terminal, metadata about at least one machine learning model accessible for execution and/or training by the terminal; and signalling circuitry for signalling, to a target network apparatus, the metadata as part of a handover procedure.

The network apparatus may comprise signalling circuitry for signalling to the terminal a request for further information on at least one of the at least one machine learning models in dependence on the received metadata.

The request for further information may be a request for at least one of the at least one machine learning models and/or further metadata relating to at least one of the at least one machine learning models.

The network apparatus may comprise determining circuitry for determining whether or not to signal the further information to the target network apparatus in dependence on the metadata, and the signalling circuitry may comprise signalling said further information when it is determined to signal the further information.

The receiving circuitry for receiving the metadata may comprise receiving circuitry for receiving the metadata with measurement data, and/or the signalling circuitry for signalling the metadata may comprise signalling circuitry for signalling the metadata as part of a Handover Request message.

The network apparatus may comprise sending circuitry for sending the at least one machine learning model to the target network apparatus in response to a received request for the at least one machine learning model from the target network apparatus.

According to a thirteenth aspect, there is provided non-transitory computer readable medium comprising program instructions for causing a network apparatus to perform at least the following: receive, as part of a handover procedure for handover of a terminal to the network apparatus, metadata about at least one machine learning model accessible for execution and/or training by the terminal; determine whether or not the terminal should execute and/or train the at least one machine learning model after the terminal is handed over to the network apparatus; and signal the result of the determining to the terminal.

The receiving may comprise receiving the metadata from a source network apparatus in the handover procedure.

The network apparatus may further be caused to: signal at least one of the terminal and a source network apparatus in the handover procedure for more information about the at least one machine learning model; and receive a response from the signalled entity.

The signalling for more information may comprise signalling a request to provide at least one of the at least one machine learning models.

The receiving may comprise receiving the metadata in a Handover Request message.

The receiving may comprise receiving metadata about at least one machine learning models accessible for training and/or execution by the terminal, and the determining may comprise determining for each of said at least one machine learning models whether or not the terminal should execute and/or train that machine learning model after the terminal is handed over to the network apparatus.

The signalling may perform said signalling after the terminal has been instructed to handover to the network apparatus, and/or the signalling may perform said signalling as part of handover signalling.

According to a fourteenth aspect, there is provided non-transitory computer readable medium comprising program instructions for causing a terminal to perform at least the following: signal, to a network apparatus, metadata about at least one machine learning model accessible for execution and/or training by the terminal; and receive signalling indicating whether or not the terminal should execute and/or train the at least one machine learning model after the terminal is handed over to the network apparatus.

The signalling may comprise signalling the metadata to a source network apparatus for signalling to the network apparatus.

The signalling may comprise signalling metadata about at least one machine learning model accessible for training and/or execution by the terminal, and the receiving may comprise receiving for each of said at least one machine learning algorithms an indication whether or not the terminal should execute and/or train that machine learning model after the terminal is handed over to the network apparatus.

The signalling may comprise signalling the metadata as part of a measurement report to a source network apparatus.

The terminal may be caused to abandon at least one of the at least one machine learning models in response to said receiving signalling.

The terminal may be caused to receive a request to provide at least one of the machine learning algorithms to a network apparatus; and respond to the request with at least one of the requested machine learning models.

According to a fifteenth aspect, there is provided non-transitory computer readable medium comprising program instructions for causing a network apparatus to perform at least the following: receive, from a terminal, metadata about at least one machine learning model accessible for execution and/or training by the terminal; and signal, to a target network apparatus, the metadata as part of a handover procedure.

The network apparatus may be caused to signal to the terminal a request for further information on at least one of the at least one machine learning models in dependence on the received metadata.

The request for further information may be a request for at least one of the at least one machine learning models and/or further metadata relating to at least one of the at least one machine learning models.

The network apparatus may be caused to determine whether or not to signal the further information to the target network apparatus in dependence on the metadata, and the signalling may comprise signalling said further information when it is determined to signal the further information.

The receiving the metadata may comprise receiving the metadata with measurement data, and/or the signalling the metadata may comprise signalling the metadata as part of a Handover Request message.

The network apparatus may be caused to send the at least one machine learning model to the target network apparatus in response to a received request for the at least one machine learning model from the target network apparatus.

According to a sixteenth aspect, there is provided a computer program comprising program instructions for causing a computer to perform any method as described above.

According to a seventeenth aspect, there is provided a computer program product stored on a medium may cause an apparatus to perform any method as described herein.

According to a nineteenth aspect, there is provided an electronic device that may comprise apparatus as described herein.

According to a twentieth aspect, there is provided a chipset that may comprise an apparatus as described herein.

In the above, many different aspects have been described. It should be appreciated that further aspects may be provided by the combination of any two or more of the aspects described above.

Various other aspects are also described in the following detailed description and in the attached claims.

DESCRIPTION OF FIGURES

Examples will now be described, by way of example only, with reference to the accompanying Figures in which:

FIGS. 7 to 9 are signalling diagrams according to examples.

DETAILED DESCRIPTION

In general, the following disclosure relates to machine learning (ML) models. In particular, the following relates to ML models that are configured to be trained and/or executed at a terminal accessing a communication network via at least one access point, (such as a gNB) and procedures related to handling ML models when such a terminal is handed over from a source access point to a target access point.

Before explaining in detail the examples, certain general principles of a wireless communication system and mobile communication devices are briefly explained with reference to FIGS. 1 to 2 to assist in understanding the technology underlying the described examples.

Figure 1:
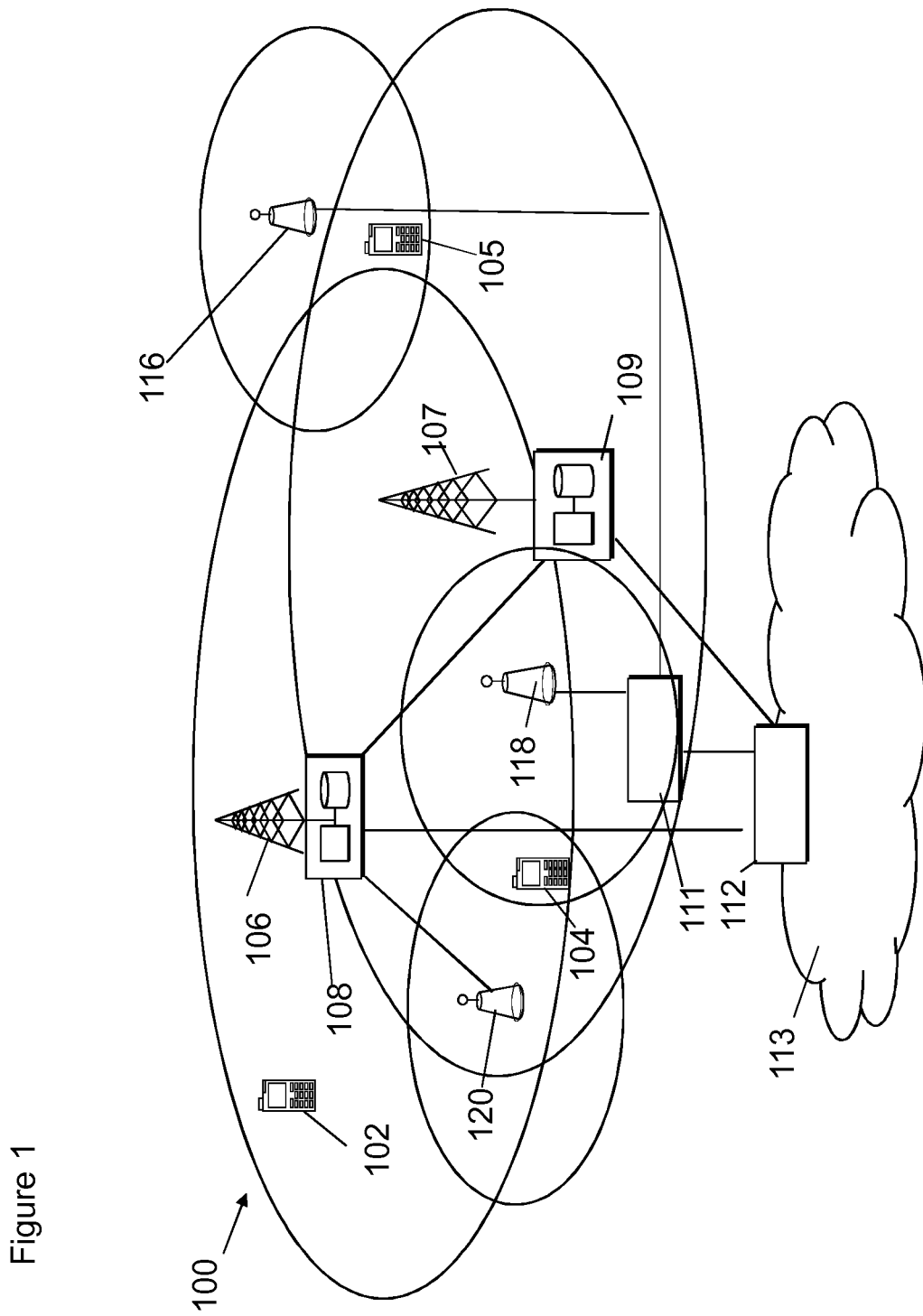
FIG. 1 shows a schematic diagram of an example communication system comprising a plurality of radio access network nodes and a plurality of communication devices.

In a wireless communication system 100, such as that shown in FIG. 1, mobile communication devices, user apparatus, or terminal 102, 104, 105 are provided wireless access via at least one radio access network node or similar wireless transmitting and/or receiving node or point. A user can access the communication system by means of an appropriate communication device or terminal. A communication device (or "terminal") of a user is often referred to as user equipment (UE) or as a user apparatus. Throughout the following, these terms will be used interchangeably. It is understood that the term "terminal" is used to cover communication devices that may access a network through an access point, and which may or may not have a user. Examples of such terminals without a user include devices that make machine-to-machine transmissions in a factory. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio) developed by the 3rd Generation Partnership Project (3GPP). An example of attempts to solve the problems associated with the increased demands for capacity is an architecture that is known as the long-term evolution (LTE) of the Universal Mobile Telecommunications System (UMTS) radio-access technology. The LTE (4G) standard. was first released in 2008 (known as LTE Release 8), and new enhancements (in form of releases) has been introduced since then. LTE Release 13 and onwards is also known as LTE Advanced Pro. The successor to the 4G networks is the fifth generation technology (5G). 5G radio systems also known as New Radio (NR) technologies have been developed in phases, from Non-Stand-Alone (NSA) to Stand-Alone (SA) system. Initial delivery of NSA NR radio system specifications for 5G took place in 2017 (known as Release 15), while standardization of further enhancements to 5G system continues.

For example, 5G systems may be viewed as comprising a terminal, a 5G radio access network (5GRAN), a 5G core network (5GCN), one or more application functions (AF) and one or more data networks (DN).

The 5GRAN may comprise one or more gNodeB (GNB) distributed unit functions connected to one or more gNodeB (GNB) centralized unit functions. The RAN may comprise one or more access nodes.

The 5GCN may comprise one or more access management functions (AMF), one or more session management functions (SMF), an authentication server function (AUSF), a unified data management (UDM), one or more user plane functions (UPF), a unified data repository (UDR), and/or a network exposure function (NEF). At least some of these 5GCN functions may work together to provide at least one service to the terminal.

A radio access network node is referred to as an eNodeB (eNB) in LTE, a gNodeB (gNB) in 5G, and may be referred to more generally as simply a network apparatus or a network access point. Radio access network nodes are typically controlled by at least one appropriate controller apparatus, so as to enable operation thereof and management of mobile communication devices in communication with the radio access network nodes. The controller apparatus may be located in a radio access network (e.g. wireless communication system 100) or in a core network (CN) (not shown) and may be implemented as one central apparatus or its functionality may be distributed over several apparatus. The controller apparatus may be part of the radio access network node and/or provided by a separate entity such as a Radio Network Controller. In FIG. 1, control apparatus 108 and 109 are shown to control the respective macro level radio access network nodes 106 and 107. In some systems, the control apparatus may additionally or alternatively be provided in a radio network controller.

LTE and 5G systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each user apparatus is served by only one MME and/or S-GW at a time and the (e)NB keeps track of current association. SAE-GW is a "high-level" user plane core network element, which may comprise the S-GW and the P-GW (serving gateway and packet data network gateway, respectively). The functionalities of the S-GW and P-GW are separated and they are not required to be co-located.

In 5G systems, radio resource control (RRC) is defined to be a sublayer of radio interface Layer 3 that exists in the control plane only, and which provides information transfer service to the non-access stratum. RRC is a protocol layer between a user apparatus and a gNB, and is in charge of, for example, paging the user apparatus when traffic comes, establishing/maintaining or release of radio bearers (establishing an RRC connection between user apparatus and gNB), user apparatus mobility, user apparatus measurement configuration and user apparatus reporting configuration, etc. RRC is responsible for controlling the configuration of radio interface Layers 1 and 2.

In FIG. 1, radio access network nodes 106 and 107 are shown as connected to a wider communications network 113 via gateway 112. A further gateway function may be provided to connect to another network.

The smaller radio access network nodes 116, 118 and 120 may also be connected to the network 113, for example by a separate gateway function and/or via the controllers of the macro level stations. The radio access network nodes 116, 118 and 120 may be pico or femto level radio access network nodes or the like. In the example, radio access network nodes 116 and 118 are connected via a gateway 111 whilst station 120 connects via the controller apparatus 108. In some examples, the smaller nodes may not be provided.

Figure 2:
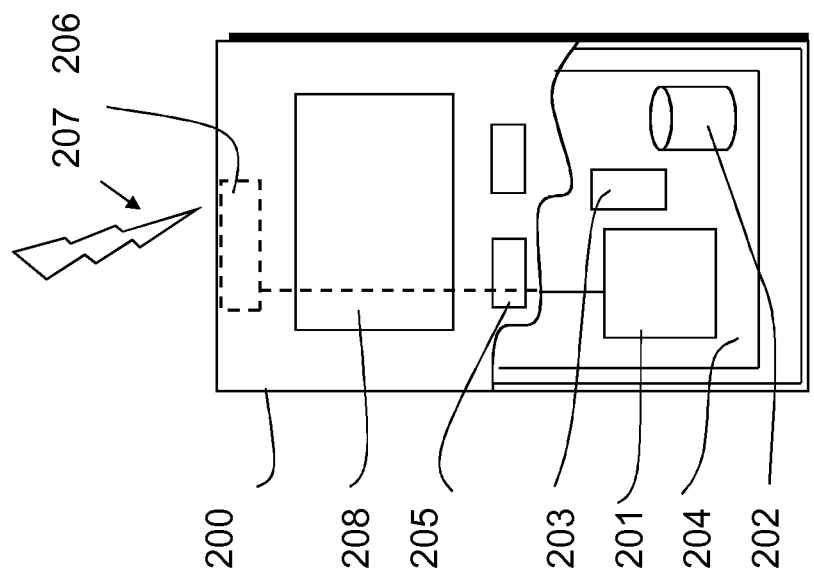
FIG. 2 shows a schematic diagram of an example mobile communication device.

A possible communication device that comprises a browser will now be described in more detail with reference to FIG. 2 showing a schematic, partially sectioned view of a communication device 200. Such a communication device is often referred to as user apparatus (UE) or terminal. An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various radio access techniques.

An example of wireless communication systems providing radio access techniques are those architectures standardized by the 3rd Generation Partnership Project (3GPP). In addition to including the 5th Generation (5G) New Radio (NR), other examples of radio access systems comprise those provided by radio access network nodes of systems that are based on technologies such as wireless local area network (WLAN) and/or WiMax (Worldwide Interoperability for Microwave Access). A radio access network node can provide coverage for an entire cell or similar radio service area.

Figure 3:
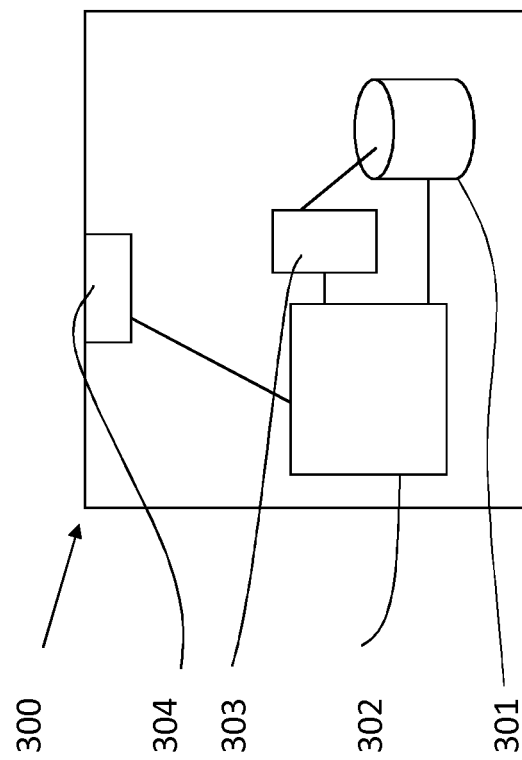
FIG. 3 shows a schematic diagram of an example network apparatus.

An example network equipment for the 3GPP system is shown in FIG. 3. FIG. 3 shows an example of a control apparatus 300 for a communication system, for example to be coupled to and/or for controlling a station of an access system, such as a radio access network node, e.g. a base station or (g)node B, or a node of a core network such as an MME or Access and Mobility Management Function (AMF). The method may be implanted in a single control apparatus or across more than one control apparatus. The control apparatus may be integrated with or external to a node or module of a core network or RAN. In some examples, radio access network nodes comprise a separate control apparatus unit or module. In other examples, the control apparatus can be another network element such as a radio network controller or a spectrum controller. In some examples, each radio access network node may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the radio access network node. The receiver and/or the transmitter may be implemented as a radio front end or a remote radio head. For example, the control apparatus 300 can be configured to execute an appropriate software code to provide the control functions. Control apparatus 300 may be included in a chipset or modem apparatus. A chipset or modem apparatus which includes apparatus 300 may be included in a control node such as a radio access network node.

5G New Radio (NR) is designed to accommodate a wide range of services on top of the traditional mobile broadband (MBB) communication. As a result of this, 5G evolution drives a need to study use cases and to propose potential service usages for 5G system support of Artificial Intelligence (AI) and Machine Learning (ML) techniques.

Training of AI/ML algorithms may use a large amount of data. This may have a significant impact on network performance and/or spectral efficiency if training of a ML model is performed at a network side. The amount of data being transmitted across network interfaces may be reduced by performing the ML model training at a user terminal instead of at a network apparatus. To this effect, a user terminal may be provided/have local access to multiple ML models. These ML models may be used, either individually or in combination, to solve one or more optimisation questions for the network. A user terminal may use at least one of these ML models to determine at least one solution to a particular problem (i.e. multiple solutions may be determined). For example, a user terminal may have a non-ML algorithm native in the user terminal, and/or the user terminal may have one or more different ML algorithms of different complexity and performance.

3GPP Release 16 defined 5G features under RAN-centric Data Collection mechanisms that enabled operators to monitor and optimise their 5G deployments. In this context, self-organising networks and MDT-defined in LTE—became the baseline for the newly 5G method of data collection. Minimization of Drive Test (MDT) is a is a measurement and reporting mechanism standardized 3GPP LTE feature which involves commercial UEs for collecting and reporting own measurements to the network (see, for example, 3GPP Technical Specification TS 37.320). The fundamental concept aims at replacing dedicated and costly drive testing performed for network optimization. MDT involves regular users of cellular network and makes usage of their data that are collected anyway (e.g. for mobility purposes).

An example of a ML model being trained at a user equipment is a model trained using Minimisation of Drive Testing (MDT) measurements. For example, a network may instruct a UE through an MDT Configuration to locally and autonomously train an ML. This may be enabled by the network triggering the UE to monitor, through measurements or pre-configured "functions of measurements", the process of learning of the provided ML model, and to directly use those measurements to train the ML model. The target output by the UE is the trained ML model.

Under current MDT descriptions, commercial user terminals collect and report their own measurements to the network. MDT involves regular users of a cellular network and utilises data that may have been collected anyway (e.g. measurements made for mobility-related reasons) and reports them to the network. There are two different types of defined reporting approaches in MDT: Immediate MDT and Logged MDT. For Immediate MDT, a user terminal generates and transmits a real time report of radio measurements immediately after performing them. For Logged MDT, a user terminal is configured, while in a connected mode, to collect data/measurements when the user terminal enters an idle mode or an inactive mode. The idle/inactive mode data/measurements are subsequently transmitted to the network when the user terminal re-enters the connected mode. These deferred reports are sometimes called logs. For example, a user terminal may indicate measurement availability to a network through a radio resource control (RRC) message, and a network may obtain the logged reports through a defined procedure, such as the UEInformationRequest/Response procedure.

Current 5G systems/specifications also utilise Immediate and Logged MDT procedures for delivering measurement results to a network (real-time in case of immediate MDT and non real-time when a user terminal was out of reach of a network apparatus). For example, a network may instruct the user terminal through an MDT configuration to locally and autonomously train an ML model. As a more specific example, a network may trigger a user terminal to monitor measurements or pre-configured "functions of measurements" that correspond to a certain network model/behaviour/or property. For example, "when the service cell received signal power is within a certain range", "how many times a service cell received signal power has fallen within a predetermined range", "when packet delay exceeds a certain threshold", "when the interference power received exceeds a certain threshold", etc. are at least some of the things that may be monitored by a user terminal. The network may also provide the user terminal with a process for learning of a ML model and how to use those measurements for training the ML model. The target output by the user terminal may be the trained ML model.

The trained ML model may be executed at the network side. Alternatively, the trained ML model may be executed by the user terminal. This ML model executed by a user terminal may be also trained at the user terminal. As another alternative, this ML model executed by a user terminal may correspond to an ML model trained by a network apparatus but downloaded to the user terminal for execution. Thus, an ML model may be executed at only a user terminal side, at only a network side, or some combination of the two sides.

As a user terminal may be provided with multiple ML models, these models may simultaneously exist in different statuses. For example, a model may be in training (e.g. where a ML model is being trained using user terminal-made measurements), in execution (e.g. when a trained ML model is being executed by a user terminal, or in an idle state (e.g. when a trained ML model is waiting to be executed by a user terminal).

The following discusses potential signalling that may be performed between a source network apparatus, a target network apparatus and/or a terminal being handed over between the source network apparatus and the target network apparatus when the terminal has at least one ML model available. The at least one ML model available may be in training, in execution, or in an idle mode.

The following will provide a general discussion before looking at specific examples of signalling that may be employed.

Figure 4:
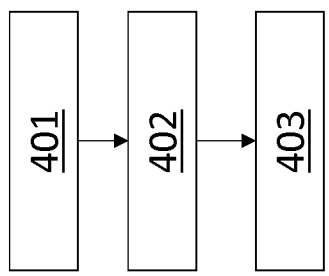

FIG. 4 is a flow chart showing potential operations that may be performed by a target network apparatus. A target network apparatus may be thought of as a network entity to which a terminal is being handed over to from a source network apparatus.

At 401, the target network apparatus receives, as part of a handover procedure for handover of a terminal to the target network apparatus, metadata about at least one machine learning model available, or otherwise accessible, to the terminal for training and/or execution. This means that the at least one machine learning model may be in an idle state/mode (e.g. awaiting execution of training), a training state/mode and/or in an execution state/mode. The metadata may be received from the terminal either directly or indirectly. When the metadata is received indirectly, the metadata may be provided directly by the source network apparatus.

At 402, the target network apparatus determines whether or not the terminal should keep the at least one machine learning model that it has available after the terminal is handed over to the network apparatus. This determination may be made in dependence on the received metadata. Optionally, this determination may be made in dependence on the received metadata and additional information obtained about the at least one machine learning model. The additional information may be as discussed further below. The available at least one machine learning model may be in a in training mode, an execution mode or an idle mode.

At 403, the target network apparatus signals the result of the determining to the terminal. This signalling may be performed directly to the terminal either during or post-handover. This signalling may be performed indirectly through the source network apparatus during handover.

As discussed above, the target network apparatus may optionally obtain additional information about the at least one machine learning model. This additional information may be obtained in response to the target network apparatus signalling at least one of the terminal and a source network apparatus during the handover procedure for more information about the at least one machine learning model. A response to this signalling that comprises the additional information may be received from the signalled entity. The signalling for more information may comprises signalling a request to provide at least one of the at least one machine learning models.

The metadata may be received in a Handover Request message. The Handover Request message may be transmitted by the source network apparatus. The contents of the Handover Request message may originate from the terminal.

Receiving the metadata may comprise receiving metadata about at least one machine learning models accessible by the terminal. In this case, the determining may comprise determining for each of said at least one machine learning models whether or not the terminal should keep that machine learning model that it has available in training, execution or idle state after the terminal is handed over to the network apparatus. Therefore, if a terminal has a set of machine learning models available to it to train and/or execute, the target network apparatus may be able to select any number of this set of machine learning models to continue with after handover. For example, the target network apparatus may select less than the full set of machine learning models to continue with after handover. The target network apparatus may select the full set of machine learning models to continue with after handover. The target network apparatus may select none of the machine learning models in the set to continue with after handover. The results of this selection may be signalled to the terminal as discussed above.

Figure 5:
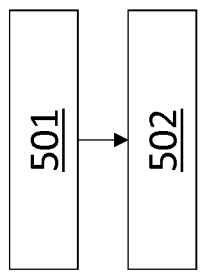

FIG. 5 is a flow chart illustrating potential operations performed by a terminal, such as a terminal access a network through a network access point such as a base station, an eNB, a gNB, etc.

At 501, the terminal signals, to a network apparatus, metadata about at least one machine learning model accessible for execution and/or training by the terminal. The metadata may be signalled to a target network apparatus either directly or indirectly. For example, the metadata may accompany measurement data that was made by the terminal during a connected mode. The measurement data may represent a state of the network that is measurable by the terminal, such as Reference Signal Received Power (RSRP), Reference Signal Received Quality (RSRQ) and available Signal to Interference and Noise Ratio (SINR) measurements.

At 502, the terminal receives signalling indicating whether or not the terminal should keep the at least one machine learning model that it has available in a training, execution or idle state/mode after the terminal is handed over to the network apparatus. The signalling may be received directly from the target network apparatus. The signalling may be received indirectly from the target network apparatus (e.g. via the source network apparatus).

The signalling may comprise signalling metadata about at least one machine learning models accessible for execution and/or training by the terminal. In this case, the receiving may comprise receiving for each of said at least one machine learning algorithms an indication whether or not the terminal should keep that machine learning model that it has available in training, execution or idle state after the terminal is handed over to the network apparatus. This may be as discussed above in relation to FIG. 4. Consequently, where less than the full set of machine models is selected for keeping by the terminal, the terminal may abandon at least one of the at least one machine learning models in response to said receiving signalling.

The terminal may receive a request to provide at least one of the machine learning models to a network apparatus. This request may be received from a source network apparatus. This request may be received from the target network apparatus. The terminal may respond to the request with at least one of the requested machine learning models. The terminal may respond to the request with only the requested at least one of the machine learning models. This may mean that less than all of the machine learning models available at the terminal for training and/or execution are indicated in the request (and therefore provided in response to the request).

Figure 6:
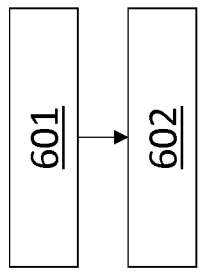
FIGS. 4 to 6 are flow charts of potential operations performed by different apparatus.

FIG. 6 is a flowchart illustrating potential operations by a source network apparatus.

At 601, the source network apparatus receives, from a terminal, metadata about at least one machine learning model accessible for execution and/or training by the terminal. The metadata may be received with measurement data, as discussed above.

At 602, the source network apparatus signals, to a target network apparatus, the metadata as part of a handover procedure. The metadata may be signalled as part of a Handover Request message.

The source network apparatus may signal to the terminal a request for further information on at least one of the at least one machine learning models. The signalled request may be made in response to receipt by the source network apparatus of a request for that information from the target network apparatus. The request for further information may be a request for at least one of the at least one machine learning models. The request for further information may be a request for MDT information associated with the at least one machine learning models. When the source network apparatus has at least one of the at least one machine learning models, the at least one machine learning model may be sent to the target network apparatus in response to a received request for the at least one machine learning model from the target network apparatus. The decision of whether or not to send the at least one machine learning model and/or MDT configuration information to the target network apparatus may be made in dependence on the received metadata.

Thus there are specified mechanisms that define terminal device and network apparatus behaviour during handover when the terminal has one or more ML models available (regardless of whether the state of any of those ML models are in a training state, an execution state, or an idle state). In one example, a terminal provides source network apparatus/access point (such as a gNB) with metadata information on the ML models that the terminal has locally available. Metadata availability information at a source network apparatus may trigger a set of possible decisions by the source network apparatus. For example, the source network apparatus receiving metadata information may decide to retrieve all or some of the available ML models at the terminal described by the available metadata. Alternatively, the source network apparatus receiving metadata information may take a decision to forward metadata information to the target network apparatus. Metadata information reception by the target network apparatus may further trigger target network apparatus to retrieve all or some of the ML models described by the metadata information. Those models can be transferred to the target network apparatus in at least two ways: directly from the terminal or through an XnAP message exchange between source and target network apparatuses. A target network apparatus can request additional information on the ML models from the source network apparatus and/or from the terminal during post-handover operations.

On the terminal side, the terminal may be enabled to continue with an ML Model or to abandon the ML Model upon network instruction. In the latter case, the terminal may receive signalling from the network (e.g. the target network apparatus and/or the source network apparatus) that triggers the terminal to carry some or all of its ML models to the target network apparatus. Alternatively, signalling from the network can trigger a terminal to abandon at least one of its ML models (and, in some cases, to abandon all of its ML models). In the present context, the "ML models" refers to those ML models locally available to the terminal in training, and/or execution, and/or in an idle state. If an abandoned ML model is a model in execution at the terminal, this may cause the terminal to start executing a corresponding non-ML algorithm.

There are several aspects to the above described system. For example, there is proposed the introduction of metadata information about ML models locally available at a terminal, the metadata information being transmitted between the terminal and a source network apparatus and/or between the source network apparatus and a target network apparatus. The metadata may be used by source and target network apparatuses when making handover decisions. Terminal behaviour during handover with respect to the ML models that terminal has internally available is also defined.

The following discusses various forms that the metadata may take. Metadata information may comprise (but is not limited to):

Model Descriptor: Metadata for a model descriptor provides some information that it usable for identifying a function of the model. For example, this may comprise an index from a catalogue entry or a model type (for example, whether the ML model is used to model terminal behavior or is used to model area-based behavior). Model descriptor may include information on the MDT Configuration that was used to train the ML model at the UE.

Status: Metadata about a ML model's status may indicate whether an ML model is being trained at a terminal, whether it is being executed at the terminal or whether it is idle waiting to be executed. Information on each of these categories may also be provided, as indicated below.

Model performance: Training
The performance of an ML model in Training can be defined in terms of a maturity condition. A maturity condition indicates whether the training has completed above a threshold (e.g., model is 80% trained) or in terms of time in training (e.g., model has been in training for a certain number of hours/days/etc.).

Model performance: Execution
The performance of an ML model in Execution can be defined compared to non-ML operation. For example, a ML model may perform more than a predetermined threshold amount better than a non-ML Model that was used before.

Information on idle state: This information may, for example, provide information on the time that an ML model has been idle. An ML model may remain in an inactive state until it is triggered for execution and/or training by the network.

Validity Area of an ML model: A ML model may be associated with a respective Validity Area outside of which the ML model is not trained or executed. A Validity Area may be defined by a centralized controller, such as an Operations, Administration and Management Function. A Validity area may span multiple cells within an access point (such as a gNB), or within different access points. The validity area may depend on the ML model/problem to be solved and/or the measurements being taken. For example:

If a ML model is used to model area-based behavior e.g., a location-dependent terminal behavior, the validity area can be the area that the ML model is characterizing (for example, cell/set of cells/Registration Area/Tracking Area).

If a ML model is used to characterize terminal behavior (e.g., related to internal terminal optimizations or other behavior that is location-independent), the Validity Area may be a PLMN List, or infinite (e.g. the Validity Area does not exist).

A source network apparatus that receives metadata information from the terminal about ML models locally available at a terminal in training, execution and/or in an idle state, may use the metadata to decide:

a. Whether to retrieve the reported ML models and/or MDT Configuration used to train the ML models by the terminal. This may be performed independently of the target network apparatus, or may be performed in response to a request for the ML models and/or the MDT Configuration that is received from the target network apparatus; and/or b. Whether to forward the metadata and/or MDT Configuration in a Handover Request to the target network apparatus. The metadata may be forwarded before any ML models and/or MDT configurations are retrieved from the terminal.

The target network apparatus may utilize the metadata information to determine whether or not it wants to receive ML models.

Signalling is introduced that allow transferring of an ML model to the target network apparatus in at least two alternatives, namely ML models are sent to target network apparatus through the terminal or through an Xn interface communication between source and target network apparatuses. Moreover, a target network apparatus may request additional information on the ML models (e.g. from the source network apparatus) post-handover.

The signalling involved in the presently described system is valid both for the case in which each of the source and target network apparatuses act independently and without any centralized control, as well as in the case in which each source and target network apparatus is coordinated by a centralized agent that decides how models are used by different network apparatuses (for example, a Radio Intelligent Controller and/or an Operations Administration and Management function).

The following discusses various examples of the above and provides some example signalling diagrams for different options.

FIG. 7 is a signalling diagram representing potential signals that may pass between a terminal 701, a source network apparatus 702, and a target network apparatus 703.

At 7001, the terminal 701 may sent a measurement report to the source network apparatus 702. The measurement report may comprise measurements, such as those made during a connected mode.

The measurement report may also comprise metadata for ML models that the terminal has locally available.

In this context, metadata means information about the ML models that the terminal has available locally. Specific non-limiting examples of types of metadata are discussed further above.

The metadata may relate to all of the ML models that the terminal has available locally. The metadata may relate to only a subset (i.e. less than all) of the ML models that the terminal has available locally. It is understood that the models may be in respective states, and do not have to be in the same state. For example, some ML models may be in training, some ML models may be in execution, and some ML models may be in an idle state and waiting for an execution instruction. As another example, some ML models may be in training and the remaining ML models may be in Idle.

To reduce the amount of signaling, metadata may not be sent in every Measurement Report message to the network apparatus. For example, ML model metadata may be sent only in the first Measurement report made to a particular network apparatus. This means that the metadata may be re-sent if the measurement report is transmitted to another entity.

As another example of reducing signaling, the metadata may be sent with a periodicity larger than the periodicity of the measurement reporting (e.g., every certain x number of measurements). Depending on what the metadata represents, certain actions at the terminal may trigger a transmission of the metadata in the measurement report. For example, if the metadata includes information relating to a state of a particular model (i.e. in training, in execution or in idle state), if the state of this model changes at the terminal, metadata representing this change may be transmitted with the next measurement report.

When the source network apparatus 702 receives the measurements from the terminal, the source network apparatus 702 may make a handover Decision 7002 to hand the terminal 701 over to target network apparatus 703. This handover decision may be made in dependence on the received measurements. As one example, the handover decision at the source network apparatus 702 may trigger the source network apparatus to retrieve all or some of the models described through the Metadata information provided by the terminal 701. This decision may to retrieve at least one ML model may depend on information provided in the metadata, such as the description, performance of the ML model, as well as on its validity area.

Therefore, at 7003, the source network apparatus 702 transmits a request to the terminal 701 for at least one ML model. The requested ML model(s) may be identified within the request.

The terminal 701 may respond with at least one of the requested ML models at 7004.

Figure 8:
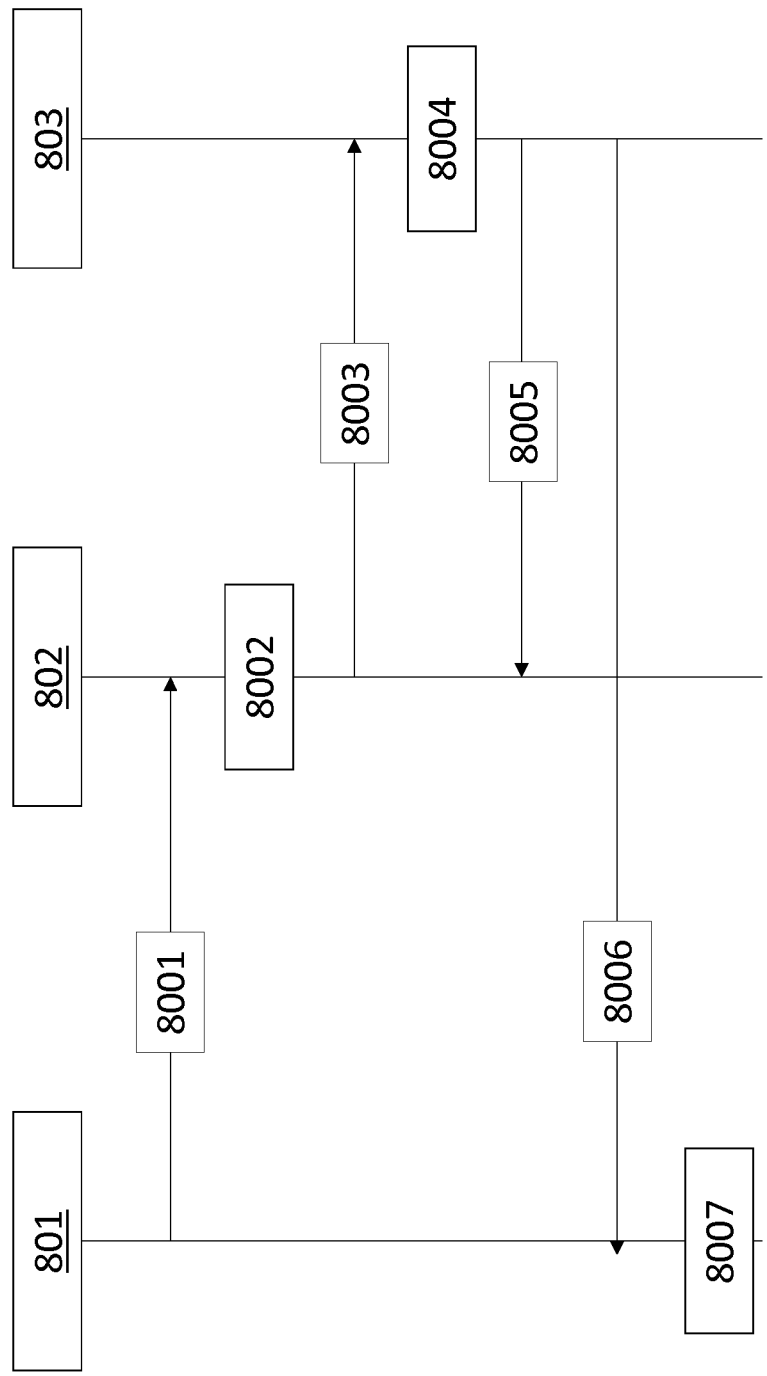

FIG. 8 is a signalling diagram representing potential signals that may pass between a terminal 801, a source network apparatus 802, and a target network apparatus 803.

At 8001, the terminal 801 sends a measurement report to the source network apparatus 802. This may be as described above in relation to 7001.

At 8002, the source network apparatus 802 makes a handover decision. This may be as described above in relation to 7002.

At 8003, the source network apparatus transmits the received metadata to the target network apparatus 803. This metadata transmission may be as part of a Handover Request transmitted by the source network apparatus to the target network apparatus as a result of the handover decision made in 8002.

At 8004, the target network apparatus 804 may perform admission control to determine whether or not it will accept the handover of the terminal 801. As part of this admission control, the target network apparatus may decide it wishes one or more of the ML models available at the terminal 801 to be provided to the target network apparatus 803 during the handover. The target network apparatus 803 may take this decision in dependence on the metadata received from the source network apparatus 802, and the related performance of each ML model. For example, depending on the metadata provided, at least one of the following factors may be considered when the target network apparatus 803 decides that at least one ML model is to be provided to the target network apparatus 803: the indicated ML model is trained beyond a predetermined maturity level; the ML Model performs more than a threshold amount better than a baseline non-ML algorithm; the Model type indicates a ML Model used for location-independent terminal behavior (as opposed to location-dependent behavior); and the inactivity time of ML model at the terminal is less than a predetermined value (this allows for ML models that have been trained a relatively long time ago to be abandoned rather than executed).

This decision/wish to receive at least one ML model may be indicated to the source network apparatus 802 as part of a Handover Request acknowledgement 8005. For example, the target network apparatus may introduce a flag value (nw-based transfer flag) in the Handover Request Acknowledgment with which it informs the source whether the ML models should be transferred over the Xn interface (nw-based transfer=1) or whether they should be carried to the target network apparatus by the terminal (nw-based transfer=0).

In this example of FIG. 8, nw-based transfer=0 and therefore, at 8006, the target network apparatus 803 informs the terminal 801 which ML models the target network apparatus 803 wishes to receive. This information may be transmitted to the terminal 801 in a Radio resource control Connection Reconfiguration message. This information may be transmitted to the terminal 801 as part of a handover command transmitted to the terminal by the target network apparatus 803.

At 8007, the terminal makes an internal decision on ML model control, and keeps the requested ML models for subsequent transfer to the target network apparatus after the terminal 801 is handed over. ML models that have not been requested may be abandoned. The terminal may also carry the MDT configuration that it has used to train each requested ML model over to the target network apparatus for use in a cell provided by the target network apparatus.

During the handover Execution phase in 8007, the terminal may handle its ML models based on information received in the handover Command. Several options are possible.

For example, when the target network apparatus 803 does not send any indication to the terminal about how to act on its ML models in the handover Command, the terminal 801 may abandon current model in execution and continue with non-ML behavior As another example, which may be applied in combination with the above example, when the target network apparatus 803 sends a handover Command with an ML Model set indicated (i.e. from at least one of the ML models indicated in the metadata, up to all of the ML models indicated in the metadata), the terminal may transfer the indicated ML models to the target network apparatus.

It is possible that a terminal has more models available than those in execution e.g., in Training mode or idle mode.

A terminal 801 may start a timer after which it plans to delete the ML model and sends the indication to the network. The terminal may then erase the ML model when the timer expires unless it receives an instruction to the contrary from the target network apparatus.

Figure 9:
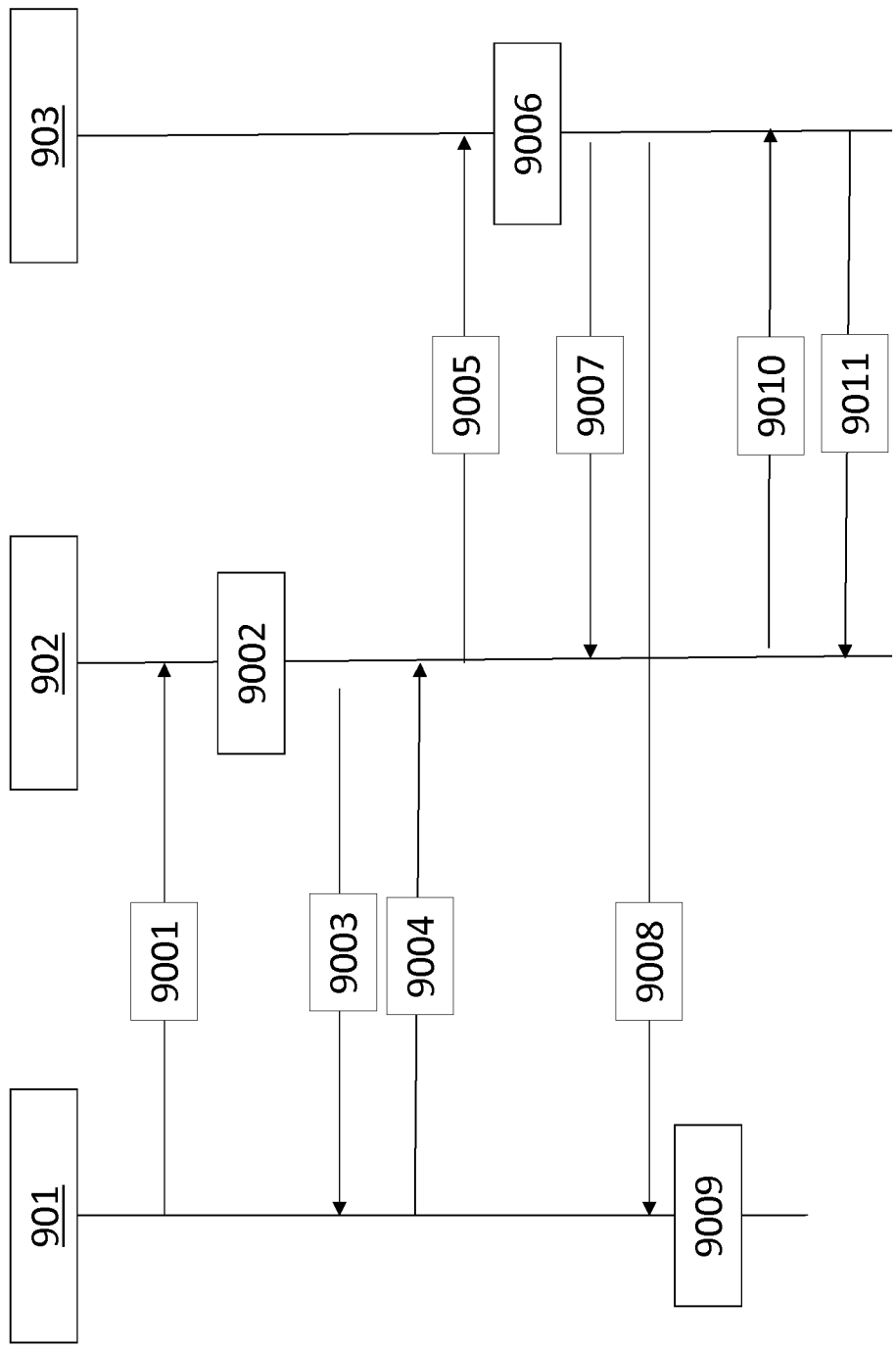

FIG. 9 is a signalling diagram representing potential signals that may pass between various of a terminal 901, a source network apparatus 902, and a target network apparatus 903.

At 9001, the terminal 901 transmits ML model metadata to the source network apparatus 902. This may be as described in 7001.

At 9002, the source network apparatus 902 makes a handover decision. This may be as described in 7002.

At 9003, the source network apparatus requests models from the terminal 901. This may be as described in 7003.

At 9004, the terminal sends to the source network apparatus 902 a response to the request received in 9003. This response may be as described in 7004.

At 9005, the source network apparatus 902 sends a Handover Request to target network apparatus 903. This may be as described in 8003.

At 9006, the target network apparatus 903 performs admission control. This may be as described in 8004.

At 9007, the target network apparatus transmits a Handover Request acknowledgement to the source network apparatus. This may be as described in 8005. In the present example, the acknowledgment indicates that the source network apparatus 902 is to provide the target network apparatus 903 with at least one of the ML models. The ML model(s) to be transferred to the network apparatus may be identified in the Handover Request acknowledgement.

At 9008, the target network apparatus 903 sends a handover command to the terminal 901. In response to receipt of this command, the terminal 901 may be enabled to start communicating with the communication network via the target network apparatus 903. In the present example, there is no ML indication sent to the terminal 901 in the handover command. In response to this lack of indication, the terminal may abandon any of its ML models being executed (if such exists), and the terminal 901 may be handed over to the target network apparatus 903 following a switch to non-ML behaviour.

At 9009, the terminal 901 makes an internal decision on ML model control, and keeps the requested ML models for subsequent transfer to the target network apparatus after the terminal 901 is handed over. ML models that have not been requested may be abandoned. The terminal may also carry the MDT configuration that it has used to train each requested ML model over to the target network apparatus for use in a cell provided by the target network apparatus.

During the handover Execution phase in 9007, the terminal may handle its ML models based on information received in the handover Command. Several options are possible.

For example, when the target network apparatus 903 does not send any indication to the terminal about how to act on its ML models in the handover Command, the terminal 901 may abandon current model in execution and continue with non-ML behavior As another example, which may be applied in combination with the above example, when the target network apparatus 903 sends a handover Command with an ML Model set indicated (i.e. from at least one of the ML models indicated in the metadata, up to all of the ML models indicated in the metadata), the terminal may transfer the indicated ML models to the target network apparatus.

It is possible that a terminal has more models available than those in execution e.g., in Training mode or idle mode.

A terminal 901 may start a timer after which it plans to delete the ML model and sends the indication to the network. The terminal may then erase the ML model when the timer expires unless it receives an instruction to the contrary from the target network apparatus.

At 9010, the source network apparatus 902 may send the ML Model Set and/or the corresponding MDT Configurations used to train the Models in the ML Model Set to the target network apparatus 903. The ML model set may be the ML model(s) identified in the acknowledgment message. The ML model Set and/or the corresponding MDT configurations may be sent through the Xn interface.

At 9011, the target network apparatus 903 sends a message to the source network apparatus acknowledging receipt of the ML model set. This acknowledgement may be optional.

At a further example, not shown, after handover has been completed, the target network apparatus may request further/additional ML model information than that already received. The further/additional ML model information may be requested from the source network apparatus. The further/additional information may be requested from the terminal. The additional/further information may be requested via existing signalling, such as via a Handover Request Ack and/or UE Context Release Request, or via in new procedure (e.g., through the Xn ML model Transfer message).

The above described system and method(s) has various advantages. For example, it introduces signalling for handover operations when a terminal has ML models available in Training, Execution or Idle. This means that network resources may be used more efficiently as only desired ML models are kept when handover is completed. Moreover, as the results of the desired ML models may be equally useful post-handover, the continuance of at least one ML model at the terminal saves terminal resources (both processing and power resources).

It should be understood that each block of the flowchart of the Figures and any combination thereof may be implemented by various means or their combinations, such as hardware, software, firmware, one or more processors and/or circuitry.

It is noted that whilst examples have been described in relation to one example of a standalone 5G, similar principles maybe applied in relation to other examples of standalone 3G, LTE or 5G networks. It should be noted that other examples may be based on other cellular technology other than LTE or on variants of LTE. Therefore, although certain examples were described above by way of example with reference to certain example architectures for wireless networks, technologies and standards, examples may be applied to any other suitable forms of communication systems than those illustrated and described herein.

It is also noted herein that while the above describes example examples, there are several variations and modifications which may be made to the disclosed solution without departing from the scope of the present claims.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various examples may be implemented in hardware or special purpose circuits, software, logic or any combination thereof. Some aspects of the described may be implemented in hardware, while other aspects may be implemented in firmware or software which may be executed by a controller, microprocessor or other computing device, although the claimed is not limited thereto. While various aspects of the claimed may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out examples. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the above disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary example of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of the appended claims.

The invention claimed is:

1. An apparatus for a terminal, the apparatus comprising:
   at least one processor; and
   at least one memory storing instructions that, when executed by the at least one processor, cause the apparatus to perform:
      signalling, to a network apparatus, metadata about at least one machine learning model accessible for execution and/or training by the terminal, wherein the metadata includes metadata about at least one machine learning model accessible for training and execution by the terminal, and wherein signalling comprises signalling the metadata as part of a measurement report to a source network apparatus for signalling to the network apparatus;
      receiving signalling via a radio resource control connection reconfiguration message indicating whether or not the terminal should execute and train the at least one machine learning model after the terminal is handed over to the network apparatus, wherein the receiving comprises receiving for each of said at least one machine learning algorithms an indication whether or not the terminal should execute and train that machine learning model after the terminal is handed over to the network apparatus;
      abandoning at least one of the at least one machine learning models in response to receiving signalling;
      receiving a request to provide at least one of the machine learning algorithms to a network apparatus;
      responding to the request with at least one of the requested machine learning models;
      starting a timer after which any machine learning models which are not in execution will be erased;
      transmitting an indication to the network apparatus that any machine learning models which are not in execution will be erased;
      if the terminal receives an instruction from the network apparatus, when the timer expires, not erasing at least one of the machine learning models which are not in execution based on the instruction; and
      if the terminal does not receive an instruction from the network apparatus, when the timer expires, erasing the machine learning models which are not in execution based on the instruction.

* * * * *